United States Patent
Kruglick

(10) Patent No.: US 10,009,824 B2
(45) Date of Patent: Jun. 26, 2018

(54) PRECODING DATA BASED ON FORWARDED CHANNEL CONDITION INFORMATION

(75) Inventor: Ezekiel Kruglick, Poway, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 254 days.

(21) Appl. No.: 12/993,167

(22) PCT Filed: Sep. 1, 2010

(86) PCT No.: PCT/US2010/047579
§ 371 (c)(1),
(2), (4) Date: Nov. 17, 2010

(87) PCT Pub. No.: WO2012/030340
PCT Pub. Date: Mar. 8, 2012

(65) Prior Publication Data
US 2012/0051282 A1 Mar. 1, 2012

(51) Int. Cl.
| | | |
|---|---|---|
| *H04W 4/40* | (2018.01) | |
| *H04W 40/12* | (2009.01) | |
| *H04L 1/00* | (2006.01) | |
| *H04L 25/03* | (2006.01) | |
| *H04L 5/00* | (2006.01) | |

(52) U.S. Cl.
CPC ........... *H04W 40/12* (2013.01); *H04L 1/0026* (2013.01); *H04L 25/03949* (2013.01); *H04W 4/40* (2018.02); *H04L 5/0023* (2013.01); *Y02D 70/00* (2018.01); *Y02D 70/1262* (2018.01); *Y02D 70/142* (2018.01); *Y02D 70/146* (2018.01); *Y02D 70/26* (2018.01); *Y02D 70/34* (2018.01)

(58) Field of Classification Search
CPC ............................ H04W 40/12; H04W 52/262
USPC .................. 370/206–211, 310–350
See application file for complete search history.

(56) References Cited

U.S. PATENT DOCUMENTS

| | | | |
|---|---|---|---|
| 5,159,596 A * | 10/1992 | Itoh ..................... | H04B 7/2643 370/329 |
| 7,302,009 B2 | 11/2007 | Walton et al. | |
| 2001/0030948 A1 | 10/2001 | Tiedemann, Jr. | |
| 2004/0252055 A1* | 12/2004 | Thomas et al. ........ | H01Q 1/246 342/372 |
| 2006/0039496 A1 | 2/2006 | Chae et al. | |

(Continued)

FOREIGN PATENT DOCUMENTS

| | | |
|---|---|---|
| CN | 101400074 A | 4/2009 |
| CN | 101567765 A | 10/2009 |

(Continued)

OTHER PUBLICATIONS

International Search Report and Written Opinion for International Application No. PCT/US2010/047579, dated Oct. 28, 2010.

(Continued)

*Primary Examiner* — Andrew W Chriss
*Assistant Examiner* — Kenan Cehic

(57) ABSTRACT

Examples are disclosed for forwarding channel condition information for a wireless communication channel and precoding data to be transmitted over the wireless communication channel based on the forwarded channel condition information.

16 Claims, 6 Drawing Sheets

(56) References Cited

U.S. PATENT DOCUMENTS

| | | |
|---|---|---|
| 2006/0072524 A1 | 4/2006 | Perahia et al. |
| 2006/0165191 A1 | 7/2006 | Lin et al. |
| 2007/0117569 A1* | 5/2007 | Ovadia ................ H04W 28/16 455/450 |
| 2007/0206691 A1 | 9/2007 | You et al. |
| 2008/0187062 A1* | 8/2008 | Pan ..................... H04B 7/0417 375/260 |
| 2008/0229177 A1 | 9/2008 | Kotecha |
| 2009/0069007 A1* | 3/2009 | Xiao .................... H04W 24/10 455/424 |
| 2009/0075686 A1 | 3/2009 | Gomadam et al. |
| 2009/0147748 A1* | 6/2009 | Ofuji et al. ................... 370/330 |
| 2009/0316567 A1* | 12/2009 | Larsson ........................ 370/201 |
| 2009/0323773 A1 | 12/2009 | Bala et al. |
| 2010/0091893 A1 | 4/2010 | Gorokhov |
| 2010/0296591 A1 | 11/2010 | Xu et al. |
| 2010/0316163 A1* | 12/2010 | Forenza et al. ............... 375/296 |
| 2011/0182271 A1* | 7/2011 | Pica .................. H04W 36/0083 370/332 |
| 2012/0202555 A1* | 8/2012 | Bergman et al. ............. 455/522 |

FOREIGN PATENT DOCUMENTS

| | | |
|---|---|---|
| EP | 1890413 A2 | 2/2008 |
| JP | 2001-268456 A | 9/2001 |
| JP | 2001-517001 A | 10/2001 |
| JP | 2005260720 A | 9/2005 |
| JP | 2005318470 A | 11/2005 |
| JP | 2007300510 A | 11/2007 |
| JP | 2008-048413 A | 2/2008 |
| JP | 2008-510418 A | 4/2008 |
| JP | 2009206945 A | 9/2009 |
| JP | 2010505368 A | 2/2010 |
| JP | 2010-508782 A | 3/2010 |
| TW | 201004174 A | 1/2010 |
| WO | 2002/100056 A1 | 12/2002 |
| WO | 2009002097 A1 | 12/2008 |
| WO | 2009023850 A1 | 2/2009 |
| WO | 2009048418 A2 | 4/2009 |
| WO | 2009110240 A1 | 11/2009 |

OTHER PUBLICATIONS

IEEE 802.11n—IEEE Standard for Information technology—Local and metropolitan area networks—Specific requirements—Part 11: Wireless LAN Medium Access Control (MAC)and Physical Layer (PHY) Specifications Amendment 5: Enhancements for Higher Throughput, New York (USA), 2009.

Korean Office Action dated Jul. 10, 2015 for Korean Application No. 10-2015-7020389.

Extended European Search Report for European Application No. EP 10856808.0 dated Oct. 2, 2017, 9 Pages.

* cited by examiner

600 A computer program product.

602 A signal bearing medium.

604 instructions for transmitting precoded data over a wireless communication channel, which, when executed by logic, cause the logic to:

receive channel condition information via a single antenna from a transmitter having a plurality of antennae, the channel condition information including information associated with transmitting data to the transmitter via one or more of a plurality of frequencies associated with the wireless communication channel;

precode data to be transmitted to the transmitter via the one or more of the plurality of frequencies based on the channel condition information; or transmit the precoded data to the transmitter via the one or more of the plurality of frequencies.

| 606 a computer-readable medium. | 608 a recordable medium. | 610 a communications medium. |

FIG. 6

PRECODING DATA BASED ON FORWARDED CHANNEL CONDITION INFORMATION

CROSS-REFERENCE TO RELATED APPLICATION

This application is a U.S. National Stage filing under 35 U.S.C. § 371 of International Application No. PCT/US10/47579, filed on Sep. 1, 2010.

BACKGROUND

Unless otherwise indicated herein, the approaches described in this section are not prior art to the claims in this application and are not admitted to be prior art by inclusion in this section.

Wireless communication and/or data systems are moving towards the use of multiple antenna systems to improve data bandwidth capabilities. For example, wireless communication standards or technologies such as IEEE 802.11n (WiFi), IEEE 802.16e (WiMax), LTE, 3GPP and E-Ultra may promote the use of wireless devices having multiple-in multiple-out (MIMO) capabilities. Typically, MIMO capable devices have two or more antennas to receive (multiple-in) and transmit (multiple-out) data over a communication channel. Also, the communication channel may include a plurality of frequencies within a spectral channel of bandwidth via which a wireless device (e.g., a base station, mobile device, computer, etc.) may transfer data to/from another wireless device. As new wireless communication systems are deployed, in some examples, a base station may have MIMO capabilities but a mobile device communicating with the base station may have only a single antenna and may not have MIMO capabilities.

SUMMARY

The present disclosure describes implementing methods to determine channel condition information for a wireless communication channel between a first wireless device having a single antenna and a second wireless device having a plurality of antennae. According to the methods the channel condition information may be forwarded to the first wireless device. In some examples, based on the forwarded channel condition information, the first wireless device may precode data to be transmitted via one or more of a plurality of frequencies associated with the wireless communication channel.

The present disclosure also describes methods to receive channel condition information via a single antenna from a transmitter having a plurality of antennae. The channel condition information may include information associated with transmitting data to the transmitter via one or more of a plurality of frequencies associated with the wireless communication channel. In some examples, data to be transmitted to the transmitter via the one or more of the plurality of frequencies may be precoded based on the channel condition information. The precoded data may then be transmitted to the transmitter via the one or more of the plurality of frequencies.

The present disclosure also describes example devices having a channel manager. The channel manager may include logic. The logic may be configured to determine channel condition information for a wireless communication channel between a first wireless device having a single antenna and a second wireless device having a plurality of antennae. The logic may also be configured to forward the channel condition information to the first wireless device. The first wireless device may precode data based on the forwarded channel condition information. In some examples, the precoded data may be transmitted via one or more of a plurality of frequencies associated with the wireless communication channel.

The present disclosure also describes example devices having a precode manager. The precode manager may include logic. The logic may be configured to receive channel condition information via a single antenna from a transmitter having a plurality of antennae. In some examples, the channel condition information may include information associated with transmitting data to the transmitter via one or more of a plurality of frequencies associated with the wireless communication channel. The logic may also be configured to precode data to be transmitted to the transmitter via the one or more of the plurality of frequencies based on the channel condition information and then transmit the precoded data to the transmitter via the one or more of the plurality of frequencies.

The present disclosure also describes example systems having an antenna array and a channel condition manager. According to these example systems, the antenna array may include a plurality of antennae. Also, the channel condition manager may include logic. The logic may be configured to determine channel condition information for a wireless communication channel with a wireless device having a single antenna and may forward the channel condition information to the wireless device. In some examples, based on the forwarded channel condition information, the wireless device may precode data to be transmitted via one or more of a plurality of frequencies associated with the wireless communication channel.

The present disclosure also describes example computer program products. In some examples, the computer program products may include a signal bearing medium having instructions for transmitting precoded data over a wireless communication channel. The instructions, which, when executed by logic may cause the logic to receive channel condition information via a single antenna from a transmitter having a plurality of antennae. In some examples, the channel condition information may include information associated with transmitting data to the transmitter via one or more of a plurality of frequencies associated with the wireless communication channel. The instructions may also cause the logic to precode data to be transmitted to the transmitter via the one or more of the plurality of frequencies based on the channel condition information and then transmit the precoded data to the transmitter via the one or more of the plurality of frequencies.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 6 illustrates a block diagram of an example computer program product; and

DETAILED DESCRIPTION

Figure 1:
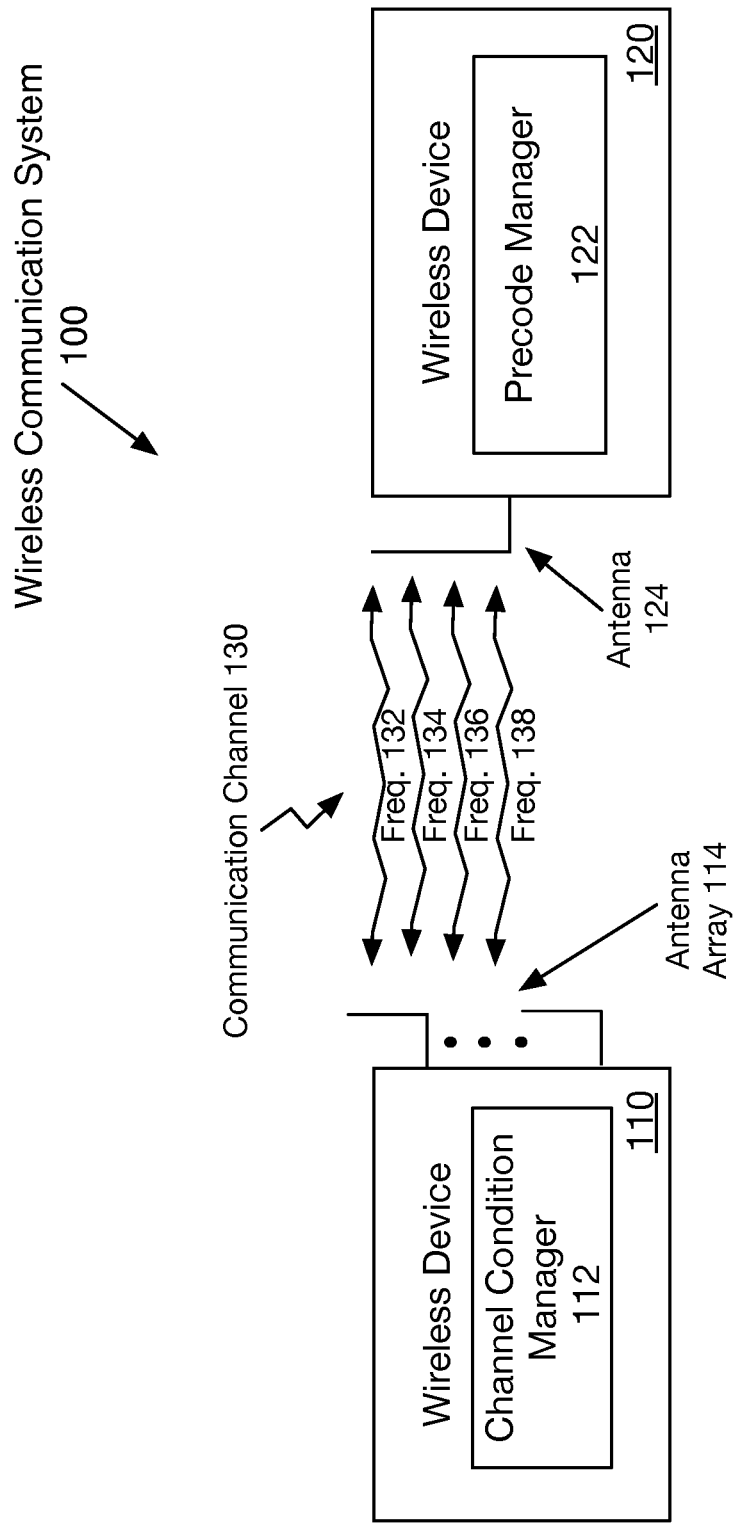
FIG. 1 illustrates an example wireless communication system.

In the following detailed description, reference is made to the accompanying drawings, which form a part hereof. In the drawings, similar symbols typically identify similar components, unless context dictates otherwise. The illustrative examples or embodiments described in the detailed description, drawings, and claims are not meant to be limiting. Other examples or embodiments may be utilized, and other changes may be made, without departing from the spirit or scope of the subject matter presented here. It will be readily understood that aspects of this disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, systems and computer program products related to forwarding channel condition information for a wireless communication channel and precoding data to be transmitted over the wireless communication channel based on the forwarded channel condition information.

As contemplated in the present disclosure, a base station may have MIMO capabilities but a mobile device communicating with the base station may have only a single antenna and may not have MIMO capabilities. In some examples, a wireless device having MIMO capabilities may have an ability to determine a condition of a communication channel using information obtained during receipt of data via its plurality of antennas and may use that channel condition information to improve signal quality, data throughput and range for transmitting data via the communication channel. The use of the channel condition information to improve data bandwidth may be referred to as precoding and may include spatial beamforming and spatial coding. However, if a wireless device has only a single antenna, the single antenna wireless device lacks the capability to self-determine a condition of a communication channel in the same manner.

In some examples, methods are implemented for forwarding channel condition information to a wireless device. The methods may include determining channel condition information for a wireless communication channel between a first wireless device having a single antenna and a second wireless device having a plurality of antennae. The determined channel condition information may be forwarded to the first wireless device and based on the channel condition information, the first wireless device may precode data to be transmitted via one or more of a plurality of frequencies associated with the wireless communication channel.

In some examples, methods are also implemented for transmitting precoded data over a wireless communication channel. These methods may include receiving channel condition information via a single antenna from a transmitter having a plurality of antennae, the channel condition information including information associated with transmitting data to the transmitter via one or more of a plurality of frequencies associated with the wireless communication channel. Data may then be precoded for transmission to the transmitter via one or more of the plurality of frequencies. The data may be precoded based on the channel condition information and then the precoded data may be transmitted to the transmitter via the one or more of the pluralities of frequencies.

FIG. 1 illustrates an example wireless communication system 100. As shown in FIG. 1, wireless communication system 100 includes wireless device 110 and wireless device 120. In some examples, the elements of wireless communication system 100 may be communicatively coupled via communication channel 130. As depicted in FIG. 1, communication channel 130 may include or may be associated with a plurality of frequencies 132, 134, 136 and 138.

In some examples, at least a portion of wireless communication system 100 may operate in compliance with an amendment to the Institute for Electrical Electronic Engineers (IEEE) Standard for Information technology—Telecommunications and information exchange between systems—Local and metropolitan area networks—Specific requirements Part 11: WLAN Media Access Controller (MAC) and Physical Layer (PHY) Specifications, published October 2009 ("IEEE 802.11n"), although this disclosure is not limited to only wireless communication systems operating in compliance with IEEE 802.11n. As shown in FIG. 1, wireless device 110 includes antenna array 114 that may include a plurality of antennae and thus may have MIMO capabilities as described in IEEE 802.11n.

In some examples, MIMO capabilities as described in IEEE 802.11n may include wireless device 110 utilizing antenna array 114 to transmit and/or receive data via a plurality of spatial streams over a communication channel (e.g., communication channel 130) having a given spectral width (e.g., 40 megahertz (MHz)). For example, a technique such as spatial division multiplexing (SDM) may utilize separate antenna of antenna array 114 to transmit and/or receive data via separate data streams. The separate data streams may be transferred simultaneously via frequencies (e.g., frequencies 132-138) within the given spectral width of the communication channel. Each frequency, for example, may also be associated with a respective antenna of antenna array 114.

As shown in FIG. 1, wireless communication system 100 includes wireless device 120 having antenna 124. In some examples, antenna 124 includes a single antenna to communicatively couple wireless device 120 with wireless device 110 via communication channel 130. For these examples, having a single antenna may not allow wireless device 120 to have at least some MIMO capabilities as described in IEEE 802.11n (e.g., determine frequency characteristics when using multiple antennae to receive data). As described more below, wireless device 110 may include channel condition manager 112. Channel condition manager 112 may have logic configured to forward channel condition information (e.g., via communication channel 130 or via a separate communication channel) to wireless device 120. The channel condition information may include, but is not limited to, signal-to-noise ratios (SNR), fading characteristics, distortion, bit error rates or other types of quality metrics that may characterize one or more frequencies associated with the communication channel. In some examples, the channel condition information may be obtained via pilot tones from wireless device 120 as the communication channel is established. For these examples, channel condition manager 112 may interpret received pilot tones to derive or determine channel condition information.

In some examples, as shown in FIG. 1 and described more below, wireless device 120 may include precode manager 122. Precode manager 122 may have logic configured to precode data based on channel condition information received from a MIMO capable wireless device (e.g., wireless device 110) via a communication channel (e.g., communication channel 130 or via a separate communication channel). The precoded data, for example, may be transmitted to the MIMO capable wireless device via one or more of a plurality of frequencies (e.g., frequencies 132-138) associated with the communication channel. For this example, since wireless device 120 has only a single antenna, wireless device 120 may lack MIMO capabilities. As described more below, wireless device 120 may use the forwarded channel condition information to precode data to improve signal quality, data throughput and range for transmitting the data via the one or more of the plurality of frequencies associated with the communication channel.

In some examples, wireless device 110 may be located at or with a base station for wireless communication system 100 and wireless device 120 may be located at or with a type of device that may be mobile or stationary, e.g., a computer, laptop, netbook, e-book, tablet, small-form factor portable (or mobile) electronic device such as a cell phone, smart phone, a personal data assistant (PDA), a personal media player device, a wireless web-watch device, a personal headset device, an application specific device, or a hybrid device that may include any of the above functions.

Figure 2:
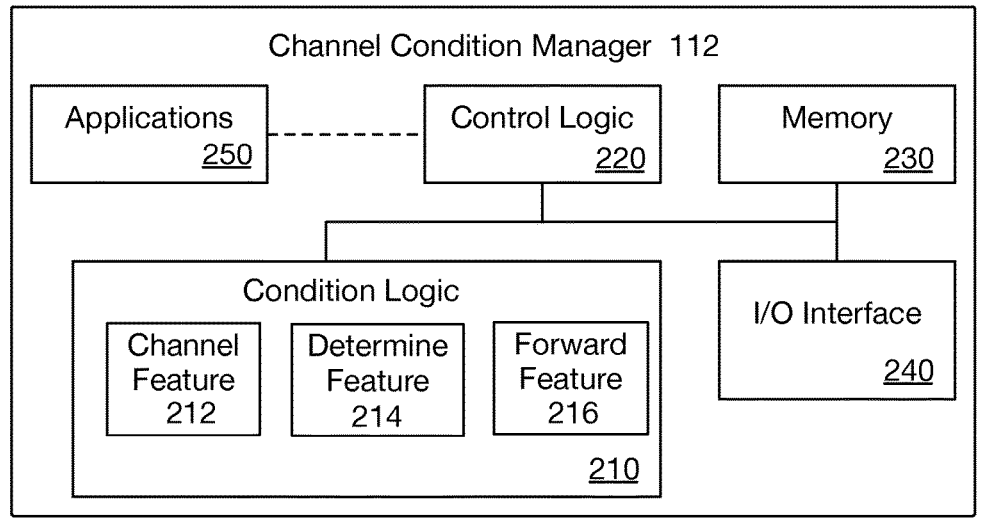
FIG. 2 illustrates a block diagram of an example architecture for a channel condition manager.

FIG. 2 illustrates a block diagram of an example architecture for a channel condition manager 112. As described above for wireless communication system 100 in FIG. 1, wireless device 110 includes channel condition manager 112. In some examples, channel condition manager 112 includes features and/or logic configured or arranged to determine and forward channel condition information to a wireless device coupled to a wireless communication channel.

The example channel condition manager 112 of FIG. 2, includes condition logic 210, control logic 220, memory 230, input/output (I/O) interfaces 240 and optionally one or more applications 250. As illustrated in FIG. 2, condition logic 210 is coupled to control logic 220, memory 230 and I/O interfaces 240. Also illustrated in FIG. 2, the optional applications 250 are arranged in cooperation with control logic 220. Condition logic 210 may further include one or more of a channel feature 212, determine feature 214 and a forward feature 216, or any reasonable combination thereof.

In some examples, the elements portrayed in FIG. 2's block diagram are configured to support or enable channel condition manager 112 as described in this disclosure. A given channel condition manager 112 may include some, all or more elements than those depicted in FIG. 2. For example, condition logic 210 and control logic 220 may separately or collectively represent a wide variety of logic device(s) to implement the features of channel condition manager 112. An example logic device may include one or more of a computer, a microprocessor, a microcontroller, a field programmable gate array (FPGA), an application specific integrated circuit (ASIC), a sequestered thread or a core of a multi-core/multi-threaded microprocessor or a combination thereof.

In some examples, as shown in FIG. 2, condition logic 210 includes one or more of a channel feature 212, a determine feature 214 and a forward feature 216. Condition logic 210 may be configured to use one or more of these features to perform operations. As described in more detail below, example operations may include determining and forwarding channel condition information to a wireless device coupled to a wireless communication channel.

In some examples, control logic 220 may be configured to control the overall operation of channel condition manager 112. As mentioned above, control logic 220 may represent any of a wide variety of logic device(s) configured to operate in conjunction with executable content or instructions to implement the control of channel condition manager 112. In some alternate examples, the features and functionality of control logic 220 may be implemented within condition logic 210.

According to some examples, memory 230 is arranged to store executable content or instructions. The executable content or instructions may be used by control logic 220 and/or condition logic 210 to implement or activate features or elements of channel condition manager 112. Memory 230 may also be arranged to temporarily maintain channel condition information to be transmitted to wireless device 120.

Memory 230 may include a wide variety of memory media including, but not limited to, one or more of volatile memory, non-volatile memory, flash memory, programmable variables or states, random access memory (RAM), read-only memory (ROM), or other static or dynamic storage media.

In some examples, I/O interfaces 240 may provide an interface via an internal communication medium or link between channel condition manager 112 and elements resident on or located with wireless device 110. I/O interfaces 240 may include interfaces that operate according to various communication protocols to communicate over the internal communication link (e.g., Inter-Integrated Circuit (I²C), System Management Bus (SMBus) or Serial Peripheral Interface Bus (SPI), etc.). I/O interfaces 240 may also provide an interface between channel condition manager 112 and elements coupled to wireless device 110 such as wireless device 120. As mentioned above for FIG. 1, wireless device 110 may couple to these elements via communication channel 130 or may also couple via a separate communication channel (not shown). The I/O interfaces 240, for example, include an interface configured to operate according to various wireless communication protocols to allow Channel condition manager 112 to communicate over communication channel 130 (e.g., IEEE 802.11n, IEEE 802.16e, LTE, 3GPP and E-Ultra).

In some examples, channel condition manager 112 includes one or more applications 250 to provide instructions to control logic 220 and/or condition logic 210. Instructions, for example, may include instructions for channel condition manager 112 to implement or use one or more of a channel feature 212, a determine feature 214 and a forward feature 216.

Figure 3:
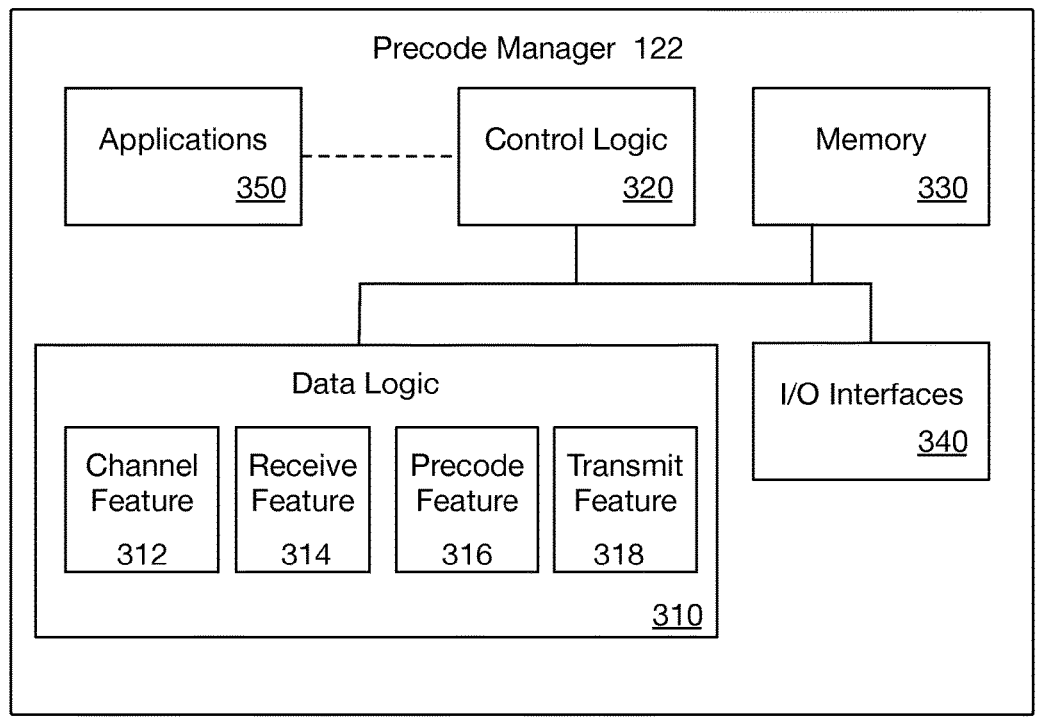
FIG. 3 illustrates a block diagram of an example architecture for a precode manager.

FIG. 3 illustrates a block diagram of an example architecture for a precode manager 122. As described above for wireless communication system 100 in FIG. 1, wireless device 120 includes precode manager 122. In some examples, precode manager 122 includes features and/or logic configured or arranged to receive channel condition information (e.g., via communication channel 130 or via a separately maintained communication channel) for a communication channel (e.g., communication channel 130), precode data based on the channel condition information and transmit the precoded data to a wireless device via the communication channel.

The example precode manager 122 of FIG. 3 includes data logic 310, control logic 320, memory 330, input/output (I/O) interfaces 340 and optionally one or more applications 350. As illustrated in FIG. 3, data logic 310 is coupled to control logic 320, memory 330 and I/O interface 340. Also illustrated in FIG. 3, the optional applications 350 are arranged in cooperation with control logic 320. Data logic 310 may further include one or more of a channel feature 312, a receive feature 314, a precode feature 316 and a transmit feature 318 or any reasonable combination thereof.

In some examples, the elements portrayed in FIG. 3's block diagram are configured to support or enable precode manager 122 as described in this disclosure. A given precode manager 122 may include some, all or more elements than those depicted in FIG. 3. For example, data logic 310 and control logic 320 may separately or collectively represent a wide variety of logic device(s) to implement the features of precode manager 122. As mentioned previously, an example logic device may include one or more of a computer, a microprocessor, a microcontroller, an FPGA, an ASIC, a sequestered thread or a core of a multi-core/multi-threaded microprocessor or a combination thereof.

In some examples, as shown in FIG. 3, data logic 310 includes one or more of a channel feature 312, a receive feature 314, a precode feature 316 and a transmit feature 318. Data logic 310 may be configured to use one or more of these features to perform operations. As described in more detail below, example operations may include receiving channel condition information for a communication channel, precoding data based on the channel condition information and transmitting the precoded data to a wireless device via the communication channel.

In some examples, control logic 320 may be configured to control the overall operation of precode manager 122. As mentioned above, control logic 320 may represent any of a wide variety of logic device(s) configured to operate in conjunction with executable content or instructions to implement the control of precode manager 122. In some alternate examples, the features and functionality of control logic 320 may be implemented within data logic 310.

Similar to memory 230 as described above, memory 330 may include a wide variety of memory media. According to some examples, memory 330 is arranged to store executable content or instructions. The executable content or instructions may be used by control logic 320 and/or data logic 310 to implement or activate features or elements of precode manager 122. Memory 330 may also be arranged to temporarily maintain at least portions of received channel condition information used to precode data.

Similar to I/O interfaces 240 as described above, I/O interfaces 340 may provide an interface via an internal communication medium or link between precode manager 122 and elements resident on or located with wireless device 120. I/O interfaces 340 may also provide an interface between precode manager 122 and elements coupled to wireless device 120 such as wireless device 110.

In some examples, precode manager 122 includes one or more applications 350 to provide instructions to control logic 320 and/or data logic 310. Instructions, for example, may include instructions for precode manager 122 to implement or use one or more of a channel feature 312, a receive feature 314, a precode feature 316 and a transmit feature 318.

Figure 4:
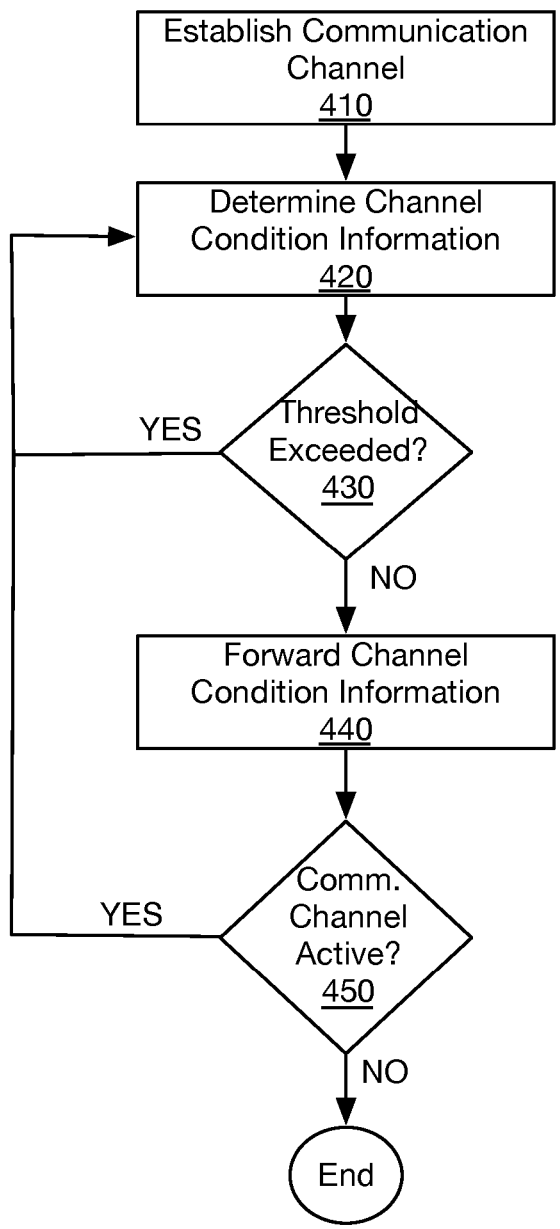
FIG. 4 illustrates a flow chart of example methods for forwarding channel condition information.

FIG. 4 illustrates a flow chart of example methods for forwarding channel condition information. In some examples, wireless communication system 100 as shown in FIG. 1, is used to illustrate example methods related to the flow chart depicted in FIG. 4. A wireless device 110 having a channel condition manager 112 as shown in FIG. 2 may also be used to illustrate the example methods. But the described methods are not limited to implementations on wireless communication system 100 as shown in FIG. 1 or to the channel condition manager 112 shown in FIG. 2. The example methods may be implemented on other wireless communication systems having one or more of the elements depicted in FIG. 1 or 2.

Beginning at block 410 (Establish Communication Channel), channel condition manager 112 of wireless device 110 may include logic and/or features configured to establish communication channel 130 (e.g., via channel feature 212) with wireless device 120. In some examples, communication channel 130 may be established in accordance with a wireless standard such as IEEE 802.11n, although this disclosure is not limited to only IEEE 802.11n.

Continuing from block 410 to block 420 (Determine Channel Condition Information), channel condition manager 112 may include logic and/or features configured to determine channel condition information (e.g., via determine feature 212) for communication channel 130. In some examples the channel condition information may include, but is not limited to, signal-to-noise ratios (SNR), fading characteristics, distortion, bit error rates or other types of quality metrics that may characterize frequencies 132-138 of communication channel 130. The channel condition information, for example, may be based, at least in part, on characterization information obtained from the plurality of antennae of antenna array 114 as communication channel 130 is established and/or maintained with wireless device 120. In some examples, the channel condition information may be obtained via communication channel 130 or may be obtained via pilot tones received from wireless device 120 as communication channel 130 is initially established.

Proceeding from block 420 to decision block 430 (Threshold Exceeded?), channel condition manager 112 may include logic and/or features configured to determine whether the channel condition information for communication channel 130 has changed at an amount that exceeds a given threshold. For example, a threshold may include the rate of change of quality metrics for one or more frequencies associated with communication channel 130. In some examples, wireless device 120 may be moving rapidly (e.g., in a moving vehicle) or has entered an environment that is causing rapid fluctuations in channel conditions (e.g., interfering signals and/or structures). For these examples, channel communication information may need to be forwarded at an increased rate. A threshold may be established based on the point at which costs in resources expended (e.g., reduced downlink capacity) by wireless device 110 to forward channel condition information at an increased rate outweigh the benefits (e.g., increased uplink capacity) of wireless device 120 using that information to precode data. So, in these examples, processing may continue from decision block 430 to block 440 if the threshold is not exceeded. Otherwise, if the threshold is exceeded, processing moves from decision block 430 to block 420.

In block 440 (Forward Channel Condition Information), channel condition manager 112 may include logic and/or features configured to forward (e.g., via forward feature 216) channel condition information for communication channel 130 to wireless device 120. In some examples, the channel condition information is forwarded via communication channel 130 or may be forwarded via a separately maintained sideband communication channel.

Proceeding from block 440 to decision block 450 (Comm. Channel Active?), channel condition manager 112 may include logic and/or features configured to determine whether communication channel 130 is still active and/or maintained (e.g., via channel feature 212). If communication channel 130 is found to be inactive the process ends. Otherwise, the process moves back to block 420 and channel condition manager 122 again determines channel condition information for communication channel 130.

Figure 5:
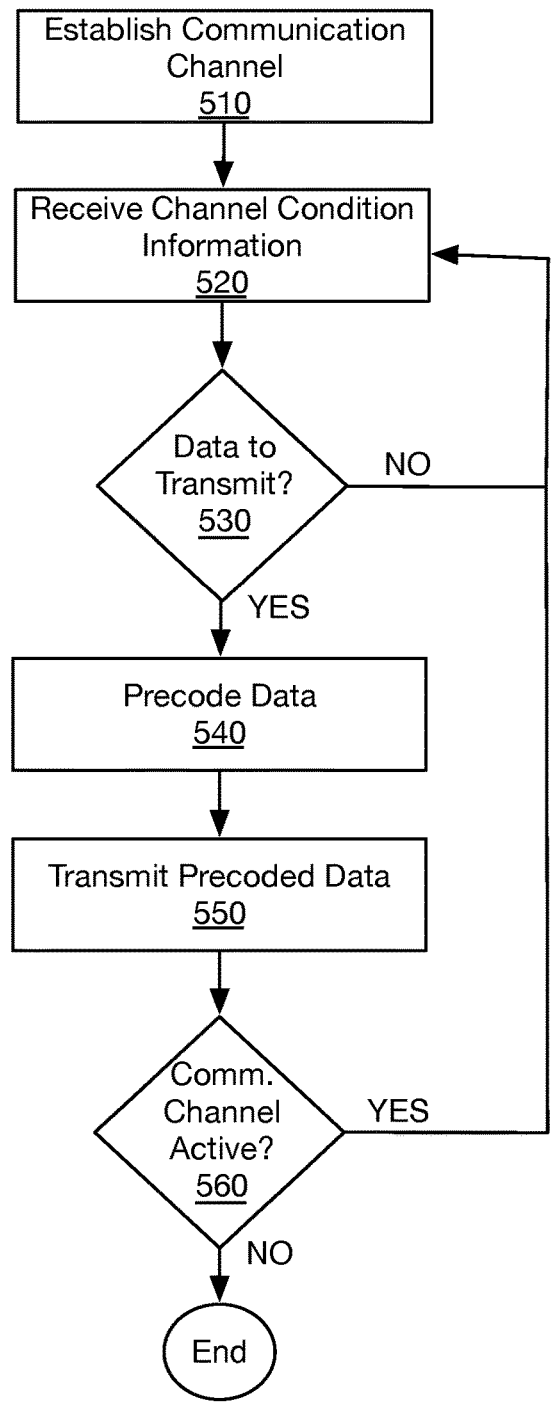
FIG. 5 illustrates a flow chart of example methods for receiving channel condition information and precoding data based on the received channel condition information.

FIG. 5 illustrates a flow chart of example methods for receiving channel condition information and precoding data based on the received channel condition information. In some examples, wireless communication system 100 as shown in FIG. 1, is used to illustrate example methods related to the flow chart depicted in FIG. 5. A wireless device 120 having a precode manager 122, as shown in FIG. 3 may also be used to illustrate the example methods. But the described methods are not limited to implementations on wireless communication system 100 as shown in FIG. 1 or to the precode manager 122 shown in FIG. 3. The example methods may be implemented on other wireless communication systems having one or more of the elements depicted in FIG. 1 or 3.

Beginning at block 510 (Establish Communication Channel), precode manager 122 of wireless device 120 may include logic and/or features configured to establish communication channel 130 (e.g., via channel feature 312) with wireless device 110. In some examples, as mentioned above, communication channel 130 may be established in accordance with a wireless standard such as IEEE 802.11n.

Continuing from block 510 to block 520 (Receive Channel Condition Information), precode manager 122 of wireless device 110 may include logic and/or features configured to receive (e.g., via receive feature 314) channel condition information forwarded from channel condition manager 112 of wireless device 110. In some examples, the channel condition information is received via communication channel 130 through wireless device 110's single antenna 124 or may be received via a separately maintained communication channel (e.g., a sideband communication channel).

Proceeding from block 520 to decision block 530 (Data to Transmit?), precode manager 122 may determine whether data is available for transmission to wireless device 110 via communication channel 130. In some examples, data may include, but is not limited to, voice, video, audio or other types of data. If data is available for transmission to wireless device 110, the process continues to block 540. Otherwise, processing moves back to block 520.

In block 540 (Precode Data), precode manager 122 may include logic and/or features configured to precode data (e.g., via precode feature 316) to be transmitted to wireless device 110 via communication channel 130. In some examples, the data is precoded based on the channel condition information forwarded from wireless device 110. For example, the channel condition information may indicate that frequencies 134 and 136 have the most favorable signal-to-noise ratios and/or also have more favorable fading characteristics as compared to frequencies 132 and 138. As a result of having favorable quality metrics, precode manager 122 may precode all or most of the data to be transmitted via frequencies 134 and 136. Precoding all or most of the data for transmission on frequencies 134 and 136 based, at least in part, on favorable quality metrics for those frequencies may increase the signal quality and data throughput as observed when wireless device 120 receives the precoded data. Precoding, for example, may include spatial beamforming and spatial coding to facilitate the increase in signal quality and data throughput.

Continuing from block 540 to block 550 (Transmit Precoded Data), precode manager 122 may include logic and/or features configured to transmit precoded data (e.g., via transmit feature 318) to wireless device 110 via communication channel 130. In some examples, as mentioned above, the data may have been precoded for transmission via frequencies 134 and 136. The precoded data may be transmitted through wireless device 120's single antenna 124.

Proceeding from block 550 to decision block 560 (Comm. Channel Active?), precode manager 122 may include logic and/or features configured to determine whether communication channel 130 is still active and/or maintained (e.g., via channel feature 312). If communication channel 130 is found to be inactive the process ends. Otherwise, the process moves back to block 520 and precode manager 122 awaits the receipt of channel condition information for communication channel 130 or may precode the next bit of data with existing channel condition information if updated channel condition information has not been received (e.g., a change threshold has been exceeded).

FIG. 6 illustrates a block diagram of an example computer program product 600. In some examples, as shown in FIG. 6, computer program product 600 includes a signal bearing medium 602 that may also include instructions 604 for transmitting precoded data over a wireless communication channel (e.g., communication channel 130). Instructions 604, which, when executed by logic (e.g., data logic 310), may cause the logic to receive channel condition information via a single antenna (e.g., antenna 124) from a transmitter (e.g., wireless device 110) having a plurality of antennae (e.g., antenna array 114), the channel condition information including information associated with transmitting data to the transmitter via one or more of a plurality of frequencies (e.g., frequencies 132-138) associated with the wireless communication channel. Instructions 604 may also cause the logic to precode data to be transmitted to the transmitter via the one or more of the plurality of frequencies based on the channel condition information. Instructions 604 may further cause the logic to transmit the precoded data to the transmitter via the one or more of the plurality of frequencies.

Also depicted in FIG. 6, in some examples, computer product 600 may include one or more of a computer readable medium 606, a recordable medium 608 and a communications medium 610. The dotted boxes around these elements depict different types of mediums included within, but not limited to, signal bearing medium 602. These types of mediums may distribute instructions 604 to be executed by logic (e.g., data logic 310). Computer readable medium 606 and recordable medium 608 may include, but are not limited to, a flexible disk, a hard disk drive (HDD), a Compact Disc (CD), a Digital Versatile Disk (DVD), a digital tape, a computer memory, etc. Communications medium 610 may include, but is not limited to, a digital and/or an analog communication medium (e.g., a fiber optic cable, a waveguide, a wired communication link, a wireless communication link, etc.).

Figure 7:
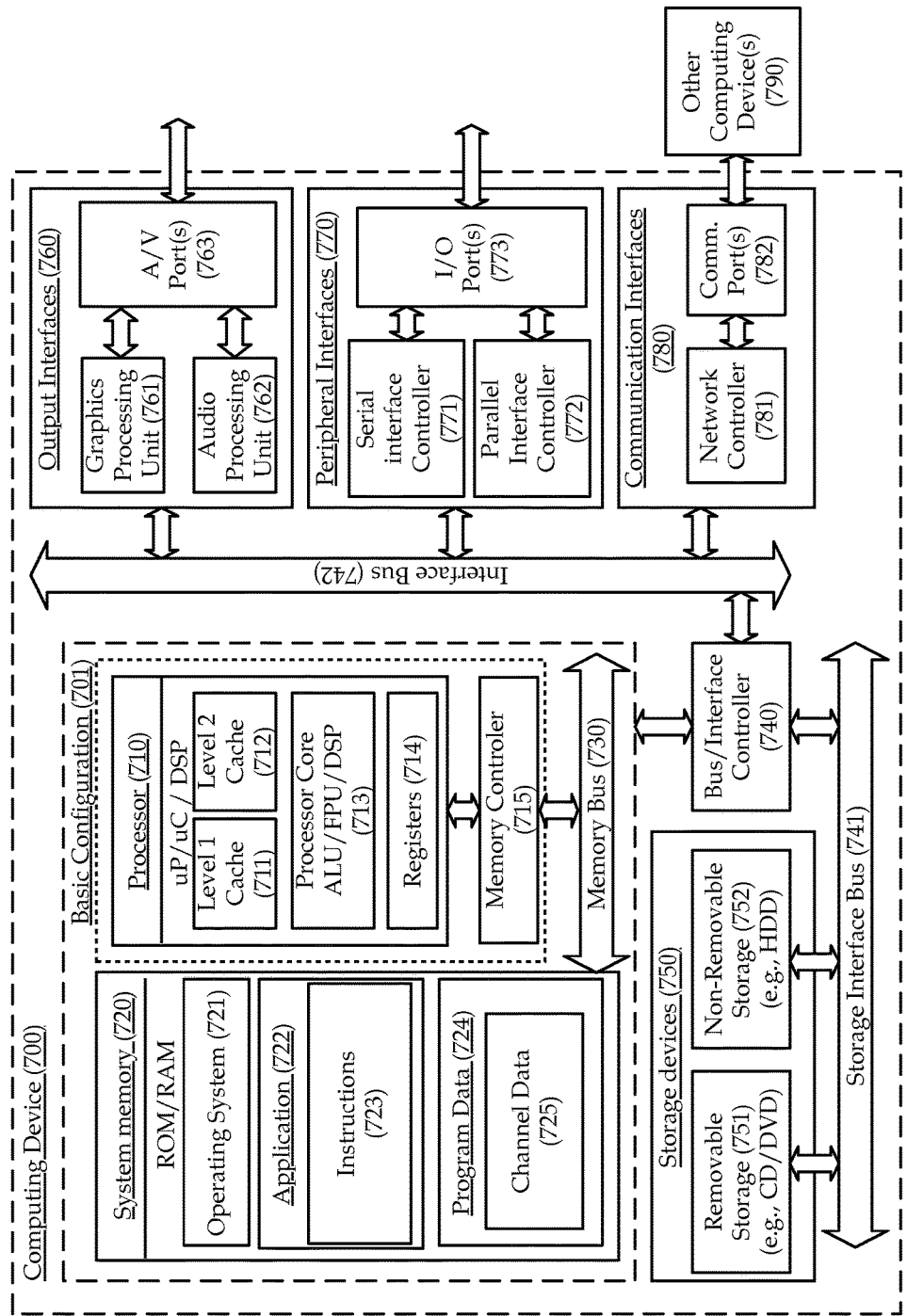
FIG. 7 illustrates an example computing device, all arranged in accordance with the present disclosure.

FIG. 7 illustrates an example computing device 700. In some examples, channel condition manager 112 and/or precode manager 122 depicted in FIGS. 1-3 may be implemented on computing device 700. In these examples, elements of computing device 700 may be arranged or configured to forward channel condition information and precode data based on the forwarded channel condition information. In a very basic configuration 701, computing device 700 typically includes one or more processors 710 and system memory 720. A memory bus 730 can be used for communicating between the processor 710 and the system memory 720.

Depending on the desired configuration, processor 710 can be of any type including but not limited to a microprocessor (µP), a microcontroller (µC), a digital signal processor (DSP), or any combination thereof. Processor 710 can include one more levels of caching, such as a level one cache 711 and a level two cache 712, a processor core 713, and registers 714. The processor core 713 can include an arithmetic logic unit (ALU), a floating point unit (FPU), a digital signal processing core (DSP Core), or any combination thereof. A memory controller 715 can also be used with the processor 710, or in some implementations the memory controller 715 can be an internal part of the processor 710.

Depending on the desired configuration, the system memory 720 can be of any type including but not limited to volatile memory (such as RAM), non-volatile memory (such as ROM, flash memory, etc.) or any combination thereof. System memory 720 typically includes an operating system 721, one or more applications 722, and program data 724. Application 722 includes instructions 723 that are arranged to perform the functions as described herein including the actions described with respect to channel condition manager 112 or precode manager 122 architectures shown in FIGS. 2 and 3 or including the actions described with respect to the flow chart shown in FIG. 4. Program Data 724 includes channel data 725 that is useful for implementing instructions 723 (e.g., determining channel condition information, precoding data, etc.). In some examples, application 722 can be arranged to operate with program data 724 on an operating system 721 such that implementations of forwarding channel condition information or precoding data based on the forwarded channel condition information may be provided as described herein. This described basic configuration is illustrated in FIG. 7 by those components within dashed line 701.

Computing device 700 can have additional features or functionality, and additional interfaces to facilitate communications between the basic configuration 701 and any required devices and interfaces. For example, a bus/interface controller 740 can be used to facilitate communications between the basic configuration 701 and one or more data storage devices 750 via a storage interface bus 741. The data storage devices 750 can be removable storage devices 751, non-removable storage devices 752, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 720, removable storage 751 and non-removable storage 752 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media can be part of device 700.

Computing device 700 can also include an interface bus 742 for facilitating communication from various interface devices (e.g., output interfaces, peripheral interfaces, and communication interfaces) to the basic configuration 701 via the bus/interface controller 740. Example output interfaces 760 include a graphics processing unit 761 and an audio processing unit 762, which can be configured to communicate to various external devices such as a display or speakers via one or more AN ports 763. Example peripheral interfaces 760 include a serial interface controller 771 or a parallel interface controller 772, which can be configured to communicate with external devices such as input devices (e.g., keyboard, mouse, pen, voice input device, touch input device, etc.) or other peripheral devices (e.g., printer, scanner, etc.) via one or more I/O ports 773. An example communication interface 780 includes a network controller 781, which can be arranged to facilitate communications with one or more other computing devices 790 over a network communication via one or more communication ports 782. A network communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 700 can be implemented as a portion of a small-form factor portable (or mobile) electronic device such as a cell phone, smart phone, a personal data assistant (PDA), a personal media player device, a wireless web-watch device, a personal headset device, an application specific device, or a hybrid device that include any of the above functions. Computing device 700 can also be implemented as a personal computer including both laptop computer and non-laptop computer configurations or implemented in a workstation or a server configuration.

References made in this disclosure to the term "responsive to" or "in response to" are not limited to responsiveness to a particular feature and/or structure. A feature may also be responsive to another feature and/or structure and also be located within that feature and/or structure. Moreover, when terms or phrases such as "coupled" or "responsive" or "in response to" or "in communication with", etc. are used herein or in the claims that follow, these terms should be interpreted broadly. For example, the phrase "coupled to" may refer to being communicatively, electrically and/or operatively coupled as appropriate for the context in which the phrase is used.

Those skilled in the art will recognize that it is common within the art to describe devices and/or processes in the fashion set forth herein, and thereafter use engineering practices to integrate such described devices (e.g., transmitters, receivers, wireless devices, computing platforms, computing devices, etc.) and/or methods into data processing systems. That is, at least a portion of the devices and/or methods described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available component, such as those typically found in data computing/communication and/or network computing/communication systems.

The herein described subject matter sometimes illustrates different components or elements contained within, or connected with, different other components or elements. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. A method, comprising:
measuring, by a base station, channel condition information for a wireless communication channel between a mobile device that includes a single antenna and a base station that includes a plurality of antennae,
wherein the wireless communication channel is associated with a plurality of channel frequencies,
wherein each of the plurality of channel frequencies is associated with a respective antenna of the plurality of antennae, and
wherein the channel condition information includes one of: a signal-to-noise ratio for a plurality of frequencies included within the plurality of channel frequencies, a distortion associated with the plurality of frequencies, a bit error rate associated with the plurality of frequencies, and a fading characteristic associated with the plurality of frequencies; and
forwarding, by the base station, the channel condition information to the mobile device, wherein based on the forwarded channel condition information, the mobile device is to precode data to be transmitted via the single antenna of the mobile device to one or more antennae of the plurality of antennae of the base station via respective one or more frequencies of the plurality of frequencies.

2. The method according to claim 1, further comprising:
determining, by the base station, whether the channel condition information indicates that the one or more frequencies of the plurality of frequencies has exceeded a threshold that includes a rate of change of a quality metric that characterizes the one or more frequencies,
wherein the forwarding includes forwarding, by the base station, the channel condition information, in response to a determination that the threshold has not been exceeded.

3. The method according to claim 1, wherein the measuring the channel condition information comprises measuring the channel condition information based on characterization information obtained from the plurality of antennae of the base station while the base station is communicatively coupled with the mobile device via the wireless communication channel.

4. The method according to claim 3, wherein the characterization information includes one of: a signal-to-noise ratio for the one or more frequencies, a distortion associated with the one or more frequencies, a bit error rate associated with the one or more frequencies, or a fading characteristic associated with the one or more frequencies.

5. A method, comprising:
receiving channel condition information, via a single antenna, from a base station that includes a plurality of antennae,
wherein the channel condition information is measured by the base station and includes information associated with transmission of data to the base station via one or more frequencies of a plurality of frequencies within a plurality of channel frequencies associated with a wireless communication channel, and
wherein the channel condition information further includes one of: a signal-to-noise ratio for the plurality of frequencies, a distortion associated with the plurality of frequencies, a bit error rate associated with the plurality of frequencies, and a fading characteristic associated with the plurality of frequencies;
precoding data to be transmitted to the base station, via the one or more frequencies of the plurality of frequencies, based on the received channel condition information; and
transmitting the precoded data via the single antenna to one or more antennae of the plurality of antennae of the base station, via respective one or more frequencies of the plurality of frequencies.

6. The method according to claim 5, wherein the precoding includes one of: spatial beamforming and spatial coding.

7. The method according to claim 5, wherein the channel condition information is measured by the base station based on characterization information obtained from the plurality of antennae of the base station while the base station is coupled with the wireless communication channel.

8. A base station, comprising:
a channel condition manager, wherein the channel condition manager includes logic that is configured to:
measure channel condition information for a wireless communication channel between a mobile device that includes a single antenna and the base station that includes a plurality of antennae,
wherein the wireless communication channel is associated with a plurality of channel frequencies,
wherein each of the plurality of channel frequencies is associated with a respective antenna of the plurality of antennae, and
wherein the channel condition information includes one of:
a signal-to-noise ratio for a plurality of frequencies included within the plurality of channel frequencies;
a distortion associated with the plurality of frequencies;
a bit error rate associated with the plurality of frequencies; and
a fading characteristic associated with the plurality of frequencies; and
forward the channel condition information to the mobile device, wherein based on the forwarded channel condition information, the mobile device is to precode data to be transmitted via the single antenna of the mobile device to one or more antennae of the plurality of antennae of the base station via respective one or more frequencies of the plurality of frequencies.

9. The base station according to claim 8, wherein to measure the channel condition information, the logic is configured to measure the channel condition information based on characterization information obtained from the plurality of antennae of the base station while the base station is communicatively coupled with the mobile device via the wireless communication channel.

10. An apparatus, comprising:
a precode manager, wherein the precode manager includes logic that is configured to:
receive channel condition information, via a single antenna, from a base station that includes a plurality of antennae,
wherein the channel condition information includes information associated with transmission of data to the base station via one or more frequencies of a plurality of frequencies within a plurality of channel frequencies associated with a wireless communication channel,
wherein the channel condition information is measured by the base station, and
wherein the channel condition information further includes one of: a signal-to-noise ratio for the plurality of frequencies, a distortion associated with the plurality of frequencies, a bit error rate associated with the plurality of frequencies, and a fading characteristic associated with the plurality of frequencies;
precode data to be transmitted to the base station, via the one or more frequencies of the plurality of frequencies, based on the received channel condition information; and
transmit the precoded data via the single antenna to one or more antennae of the plurality of antennae of the base station via respective one or more frequencies of the plurality of frequencies.

11. The apparatus according to claim 10, wherein to precode the data, the logic is configured to perform one of: spatial beamforming and spatial coding.

12. A system to forward channel condition information, the system comprising:
an antenna array that includes a plurality of antennae; and
a channel condition manager, communicatively coupled to the antenna array, wherein the channel condition manager includes logic that is configured to:
measure the channel condition information for a wireless communication channel between a wireless device, that includes a single antenna, and the antenna array,
wherein the wireless communication channel is associated with a plurality of channel frequencies,
wherein each of the plurality of channel frequencies is associated with a respective antenna of the plurality of antennae, and
wherein the channel condition information includes one of:
a signal-to-noise ratio for a plurality of frequencies included within the plurality of channel frequencies;

a distortion associated with the plurality of frequencies;
a bit error rate associated with the plurality of frequencies; and
a fading characteristic associated with the plurality of frequencies; and
forward the channel condition information to the wireless device, wherein based on the forwarded channel condition information, the wireless device is to precode data to be transmitted via the single antenna of the wireless device to one or more antennae of the plurality of antennae via respective one or more frequencies of the plurality of frequencies.

13. The system according to claim 12, wherein to measure the channel condition information, the logic is configured to measure the channel condition information based on characterization information obtained from the antenna array while the antenna array is coupled with the wireless communication channel.

14. A non-transitory computer medium that includes instructions to transmit precoded data over a wireless communication channel, wherein the instructions, in response to execution by logic, cause the logic to perform or cause to be performed:
identify channel condition information received via a single antenna from a base station that includes a plurality of antennae,
wherein the channel condition information includes information associated with transmission of data to the base station via one or more frequencies of a plurality of frequencies within a plurality of channel frequencies associated with the wireless communication channel,
wherein the channel condition information is measured by the base station, and
wherein the channel condition information further includes one of:
a signal-to-noise ratio for the plurality of frequencies;
a distortion associated with the plurality of frequencies;
a bit error rate associated with the plurality of frequencies; and
a fading characteristic associated with the plurality of frequencies;
precode data to be transmitted to the base station via the one or more frequencies of the plurality of frequencies based on the received channel condition information; and
transmit the precoded data via the single antenna to one or more antennae of the plurality of antennae of the base station via respective one or more frequencies of the plurality of frequencies.

15. The non-transitory computer program product according to claim 14, wherein the channel condition information is measured based on characterization information obtained from the plurality of antennae of the base station while the base station is coupled with the wireless communication channel.

16. The system according to claim 12, wherein the logic is configured to:
determine whether the channel condition information indicates that one or more particular frequencies of the plurality of frequencies has exceeded a threshold that includes a rate of change of a quality metric that characterizes the one or more particular frequencies; and
forward the channel condition information, in response to the determination that the threshold has not been exceeded.

* * * * *